US012555442B2

(12) United States Patent
Uberuaga et al.

(10) Patent No.: US 12,555,442 B2
(45) Date of Patent: Feb. 17, 2026

(54) ELECTRONIC GAMING SYSTEM EMPLOYING FOUR BASE GAMES AND A RANDOMLY ACTIVATED FEATURE

(71) Applicant: Aristocrat Technologies, Inc., Las Vegas, NV (US)

(72) Inventors: Christmas Uberuaga, Reno, NV (US); Scott Delekta, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 167 days.

(21) Appl. No.: 18/356,057

(22) Filed: Jul. 20, 2023

(65) Prior Publication Data

US 2024/0087423 A1 Mar. 14, 2024

Related U.S. Application Data

(60) Provisional application No. 63/406,115, filed on Sep. 13, 2022.

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
None
See application file for complete search history.

(56) References Cited

U.S. PATENT DOCUMENTS

| | | | | |
|---|---|---|---|---|
| 4,856,787 | A * | 8/1989 | Itkis | G07F 17/3262 273/237 |
| 5,890,962 | A * | 4/1999 | Takemoto | G07F 17/3211 463/31 |
| 6,652,378 | B2 * | 11/2003 | Cannon | G07F 17/326 463/31 |
| 7,601,061 | B2 * | 10/2009 | Jackson | G07F 17/34 463/19 |
| 7,988,549 | B2 * | 8/2011 | Little | G07F 17/34 345/670 |
| 8,109,821 | B2 * | 2/2012 | Kovacs | G07F 17/3211 463/19 |
| 8,137,174 | B2 * | 3/2012 | Nicely | G07F 17/3258 273/306 |
| 8,388,435 | B2 * | 3/2013 | Anderson | G07F 17/32 436/16 |
| 8,512,120 | B2 * | 8/2013 | Nelson | G07F 17/3225 463/16 |
| 8,540,567 | B2 * | 9/2013 | Nelson | G07F 17/326 463/25 |

(Continued)

*Primary Examiner* — Paul A D'Agostino
(74) *Attorney, Agent, or Firm* — Weaver Austin Villeneuve & Sampson LLP

(57) ABSTRACT

Systems, devices and methods are disclosed for an electronic gaming system employing four base games and a randomly activated feature. Each of the four base games are activated from a single player input, and the awards of one of the base games is extended to each other of the base games. Timing and type of randomly activated feature may be determined based on a weighted table, such that features with higher payouts have a lower probability of being presented than features with lower payouts.

20 Claims, 14 Drawing Sheets

(56) References Cited

U.S. PATENT DOCUMENTS

| | | | | |
|---|---|---|---|---|
| 8,662,993 | B1 * | 3/2014 | White | G07F 17/3251 463/20 |
| 8,715,070 | B2 * | 5/2014 | Cannon | G07F 17/3267 463/25 |
| 8,986,106 | B2 * | 3/2015 | Nicely | G07F 17/326 463/25 |
| 9,005,004 | B2 * | 4/2015 | Nicely | G07F 17/322 463/17 |
| 9,196,132 | B2 * | 11/2015 | Gomez | G07F 17/3213 |
| 9,208,648 | B2 * | 12/2015 | Hughes | G07F 17/326 |
| 9,214,069 | B2 * | 12/2015 | Rucker | G07F 17/3267 |
| 9,245,418 | B2 * | 1/2016 | Mitchell | G07F 17/3213 |
| 9,355,528 | B2 * | 5/2016 | Nicely | G07F 17/3267 |
| 9,390,588 | B2 * | 7/2016 | Elias | G07F 17/3267 |
| 9,721,422 | B2 * | 8/2017 | Mitchell | G07F 17/3267 |
| 9,728,048 | B2 * | 8/2017 | Saunders | G07F 17/326 |
| 9,792,761 | B2 * | 10/2017 | Gagner | G07F 17/3262 |
| 9,875,618 | B2 * | 1/2018 | SeLegue | G07F 17/3267 |
| 10,482,705 | B2 * | 11/2019 | Hilbert | G07F 17/3227 |
| 10,559,163 | B2 * | 2/2020 | Nicely | G07F 17/3244 |
| 10,706,689 | B2 * | 7/2020 | Zielinski | G07F 17/34 |
| 10,755,529 | B2 * | 8/2020 | Brown | G07F 17/3293 |
| 10,818,145 | B2 * | 10/2020 | Kendall | G07F 17/34 |
| 11,145,162 | B2 * | 10/2021 | Nicely | G07F 17/3267 |
| 11,244,542 | B2 * | 2/2022 | Uberuaga | G07F 17/3244 |
| 11,941,946 | B2 * | 3/2024 | Baerlocher | G07F 17/3267 |
| 2002/0183105 | A1 * | 12/2002 | Cannon | G07F 17/32 463/16 |
| 2004/0072619 | A1 * | 4/2004 | Brosnan | G07F 17/3276 463/42 |
| 2004/0192431 | A1 * | 9/2004 | Singer | G07F 17/34 463/20 |
| 2009/0191942 | A1 * | 7/2009 | Bennett | G07F 17/3288 463/20 |
| 2010/0124984 | A1 * | 5/2010 | DePalma | G07F 17/32 463/25 |
| 2011/0218034 | A1 * | 9/2011 | Barclay | G07F 17/32 463/25 |
| 2012/0122564 | A1 * | 5/2012 | Kovacs | G07F 17/3272 463/25 |
| 2014/0087841 | A1 * | 3/2014 | Council | G07F 17/3244 463/25 |
| 2016/0093139 | A1 * | 3/2016 | Zielinski | G07F 17/3244 463/20 |
| 2016/0093145 | A1 * | 3/2016 | Kitamura | G07F 17/3267 463/17 |
| 2017/0221313 | A1 * | 8/2017 | Basallo | G06Q 20/3278 |
| 2018/0040191 | A1 * | 2/2018 | Tran | G07F 17/3267 |
| 2018/0089952 | A1 * | 3/2018 | Heenan | G07F 17/3276 |
| 2019/0073878 | A1 * | 3/2019 | Kendall | G07F 17/34 |
| 2019/0130704 | A1 * | 5/2019 | Cormack | G07F 17/3213 |
| 2019/0295377 | A1 * | 9/2019 | Suda | G07F 17/3244 |

* cited by examiner

FIG. 4B
400
414
418
416
420
$10,000.04
GRAND
$750.18
MAJOR
$50.00
MINOR
$10.00
MINI
426
MEGA
LINE
POMPEII
50
LIONS
411
403
GAME
CHOOSE YOUR FEATURE
8 FREE GAMES
OR
MEGA
LINE
FEATURE
405
407
160
245
153295
422
424

ELECTRONIC GAMING SYSTEM EMPLOYING FOUR BASE GAMES AND A RANDOMLY ACTIVATED FEATURE

RELATED APPLICATION(S)

The present application claims priority to U.S. Provisional Patent Application No. 63/406,115, filed Sep. 13, 2022, and entitled "Electronic Gaming System Employing Four Base Games And A Randomly Activated Feature", which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Gaming systems or devices may allow players to win awards. The awards may be determined based on predefined volatility criteria or RTP. Yet technical problems exist involving how a gaming device may satisfy a designated game RTP that either complies with applicable regulations for certain game features or is set to achieve a certain game volatility, where the gaming device involves a single window game instance converted to multiple window game instances based on random outcomes, with persistent game symbols and increasing the numbers of ways to win based on bet sizes. To meet or satisfy a target volatility criterion or designated RTP, the random nature of a game determination may, in a such a game conversion configuration with increasing the number of game instances in display windows, in turn and for example, drive a game device to over process and generate numerous game outcomes in the background for each display window before determining and displaying a game outcome to a player that satisfies the target volatility criterion or designated RTP for the designated jurisdiction.

Repeated determination of whether each of the numerous game outcomes yields the designated volatility each time the game is played may be an inefficient, and time and resource consuming process. Additionally, the confined screen size of many gaming devices creates challenges as to how game changes and related information are effectively communicated to the viewer.

SUMMARY

Systems, devices and methods for an electronic gaming system employing four base games and a randomly activated feature. In some examples, each of the four base games are activated from a single player input, and the awards of one of the base games is extended to each other of the base games. In some examples, the timing and type of randomly activated feature may be determined based on a weighted table, such that features with higher payouts have a lower probability of being presented than features with lower payouts.

DETAILED DESCRIPTION

Figure 1:
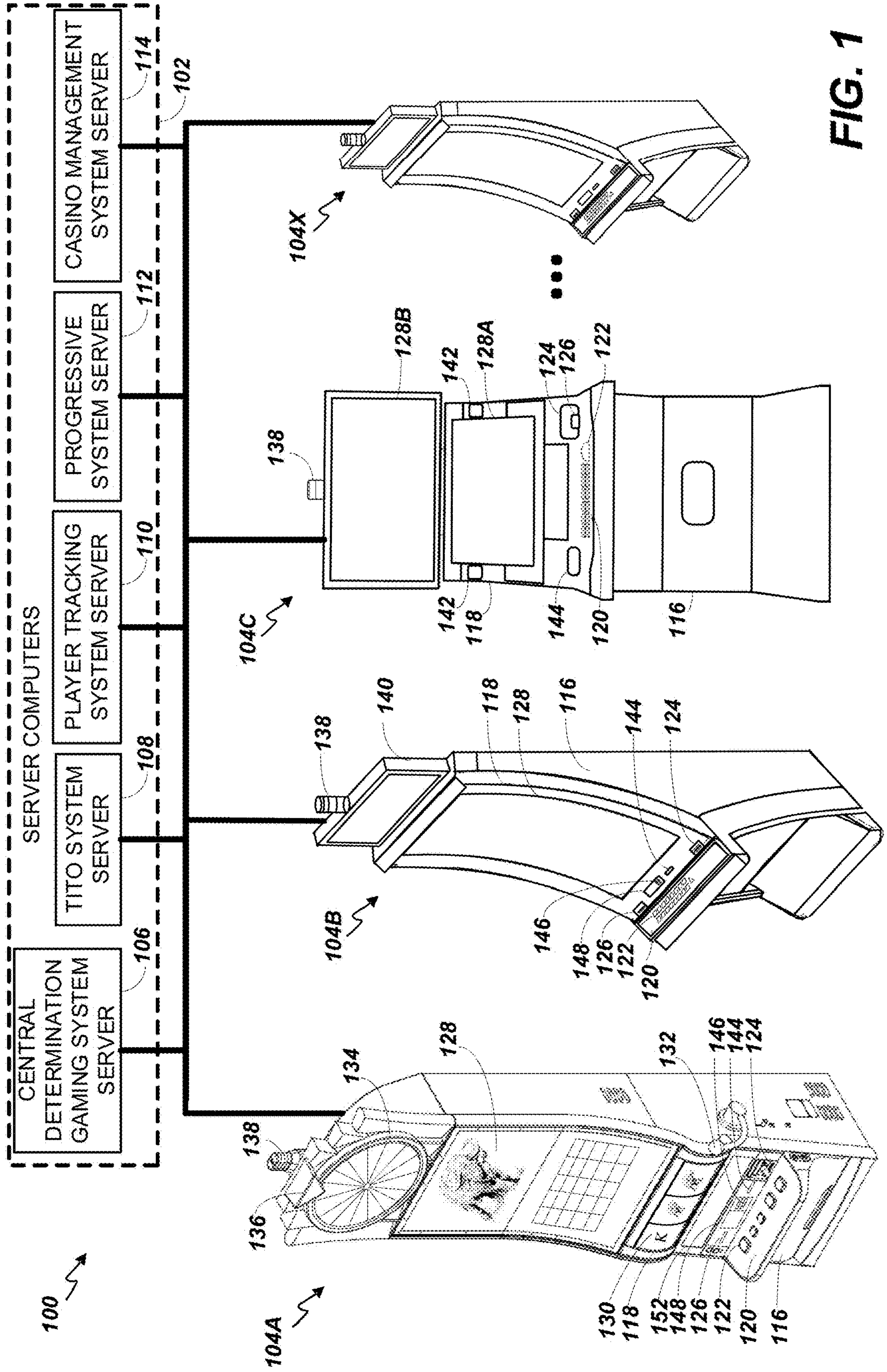
FIG. 1 is an exemplary diagram showing several EGMs networked with various gaming related servers.

Systems, devices and methods for an electronic gaming system employing four base games and a randomly activated feature. In some examples, a feature can randomly occur during or at the end of a reel spin (e.g., on one or more of the four base games). If a first feature (such as a Mega Train feature) randomly appears, a sum of all awards (e.g., Cash Express Wins) is awarded up to a predetermined multiplier (e.g., 10 times). If a second feature (such as a Mega Star feature randomly appears, a sum of all awards (e.g., Cash Express credit symbol) wins is awarded. The first and second random features generate cash on reels on the four different gaming windows. Additionally, wins are based on credit symbols that land across each of the multiple base games (e.g., presented in one or more of the multiple (four) different game windows).

In disclosed examples, a type and/or amount of payout (e.g., awards, bonuses, features, etc.) are determined randomly (e.g., based on one or more RNG calls). For instance, once a type of payout is determined, one or more paytables are accessed to determine an outcome for a corresponding base game. The probability of earning a particular type or amount of payout can be weighted and/or modified (e.g., based on a bet amount, access to an earned bonus or free game, etc.). When gameplay is initiated, although different games may be presented and played in the different windows, any weights or probabilities applied to determine the payout type and/or amount is balanced across the multiple games, such that each game has a similar probability of achieving any given type or amount of payout.

In an example, a player operates a remote device connected to and/or controlling one or more shared and/or large displays (e.g., a display screen, 80" television, etc.). The remote device (e.g., a phone, tablet, remote controller, etc.) would itself be capable of displaying one or more games (e.g., windows) of a multi-game display. In some examples, the mobile device is operable to display all windows of the multi-game windows, say serially and then together or maybe the windows would spin on reel of sorts showing each window to the player during the spins.

Examples provided in the present disclosure represent a technical improvement in the art of electronic gaming machines, devices, systems, and operation of such electronic gaming machines, devices, or systems. Some embodiments of the present disclosure include an improved electronic gaming machine or system to dynamically operate multiple base games simultaneously, each with a unique probability for earning rewards and, ultimately, to present the player with an opportunity to select from a variety of bonus games or dynamic features.

However, game design challenges arise when implementing multiple base games. Technical challenges occur, and have to be overcome, when multiple games are implemented simultaneously, because increasing the number of base games risks potential high probability of earning awards and increased payouts that exceed allowable RTP. These challenges require realization of gaming machine processing configuration to control enhanced play characteristics across each of the multiple base games due to changing volatility and to achieve a predetermined RTP for the different base games.

More specifically, by way of example, exemplary embodiments of the present disclosure improve the technical capability of the electronic gaming machines, devices, and systems. An enhanced technical capability may be accomplished by controlling the processor to control activation and operation of each base game, where a processor is driven to perform a sequence of instructions involving multiple individual base games and different base game states stored in a memory. Game execution can be based on a defined trigger probability associated with each of the base games, including a selectable type of game, and assigned ranges of values returnable in conjunction with a random number generator (RNG) to trigger one or more of the base games, bonus games and/or dynamic features, for example. In general, embodiments of the present disclosure dynamically configure activation and operation of the base game with game characteristics and game states when each base game is triggered, while still achieving a predetermined volatility and/or a predetermined RTP to comply with jurisdictional regulations.

Technical challenges exist in determining types and amounts of awards for gameplay with multiple base game. In some embodiments of the present disclosure, the points, credits, or states achieved in one base game may affect which and/or how a bonus game or dynamic feature game is offered, and particularly, how the volatility associated with selection of awards and amounts is determined. For example, in some embodiments, the improvement in gaming machine capability occurs through operational advantages in, among other things, configuring a triggered feature game by processing dynamically to allow the credits accumulated, counted or monitored to trigger or activate a bonus game or dynamic feature, to determine a number of reel spins to collect the credits required to activate the bonus game or dynamic feature, to change weight tables and/or reels for determining wins and/or awards, and to determine additional payouts or awards dynamically when the bonus game or dynamic feature is achieved and/or selected.

Challenges also occur in steady state base game progressions. Improvements in game machine capability occur with embodiments of the present invention through recognition of the advantages of employing game processing to control the speeds or progression at which base games transition or progress from a given award to a bonus award or dynamic feature, while achieving the desired RTP and game volatility. As such, in some embodiments, the progression or speed may be controlled, for example, such that higher paying variations will offer bonus awards or dynamic features more quickly. In other embodiments, the progression or speed may be controlled by having more opportunities to play the base games (e.g., free play), such that the transition from base gameplay to a bonus award or dynamic feature may take longer. In yet other embodiments, the progression or speed may be controlled, for example, such that higher paying variations will access bonus awards or dynamic features more slowly.

Additionally, an improvement in the graphical user interface of the game machine is achieved by employing a feature game that may, concurrently or subsequently, function to animate special effects on a display in response to one or more of the dynamic feature games being initiated based on a player selection. Such graphical effects on the display efficiently use the available fixed-size display screen of the gaming machine or device to visually communicate enhanced game play characteristics and outcomes, while still accommodating presentation and appreciation of traditional gaming visual effects, e.g., a base game, and credits, etc. Such a display allows the player to rapidly appreciate and understand visually the graphical effects game progress, award differences and gaming actions to be taken without being overly burdened by complicated visual presentation and mathematical calculations. The enhanced display, in turn, provides improved game interaction and anticipation characteristics for the player and provide more varied game outcomes. Thus, embodiments of the present disclosure are not merely new game rules or simply new display patterns, but provide technologic improvements to computer and gaming capabilities and graphical user interfaces in the technical art of electronic gaming machines.

The above example is not intended to be limiting, but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
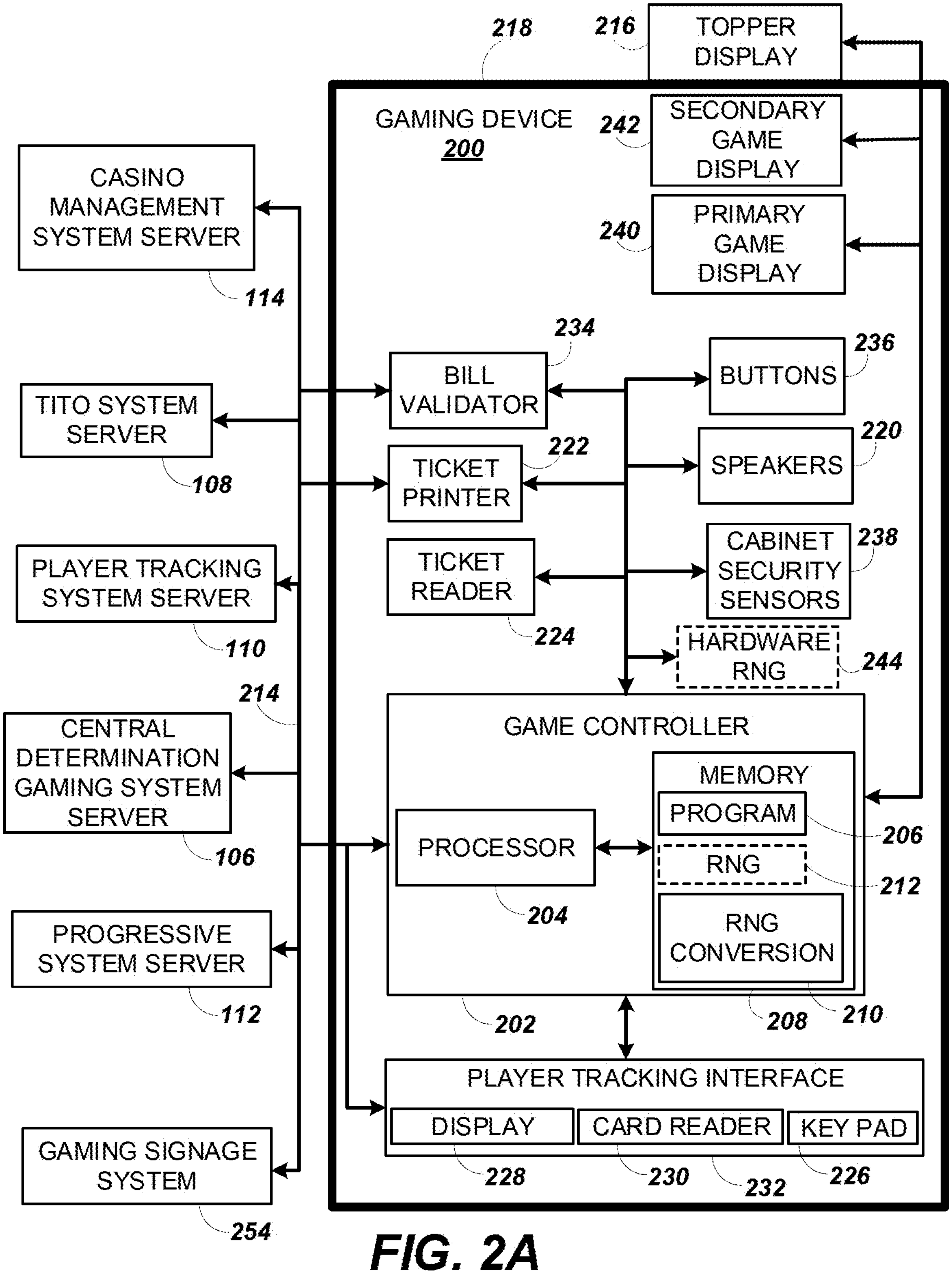
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A)

configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
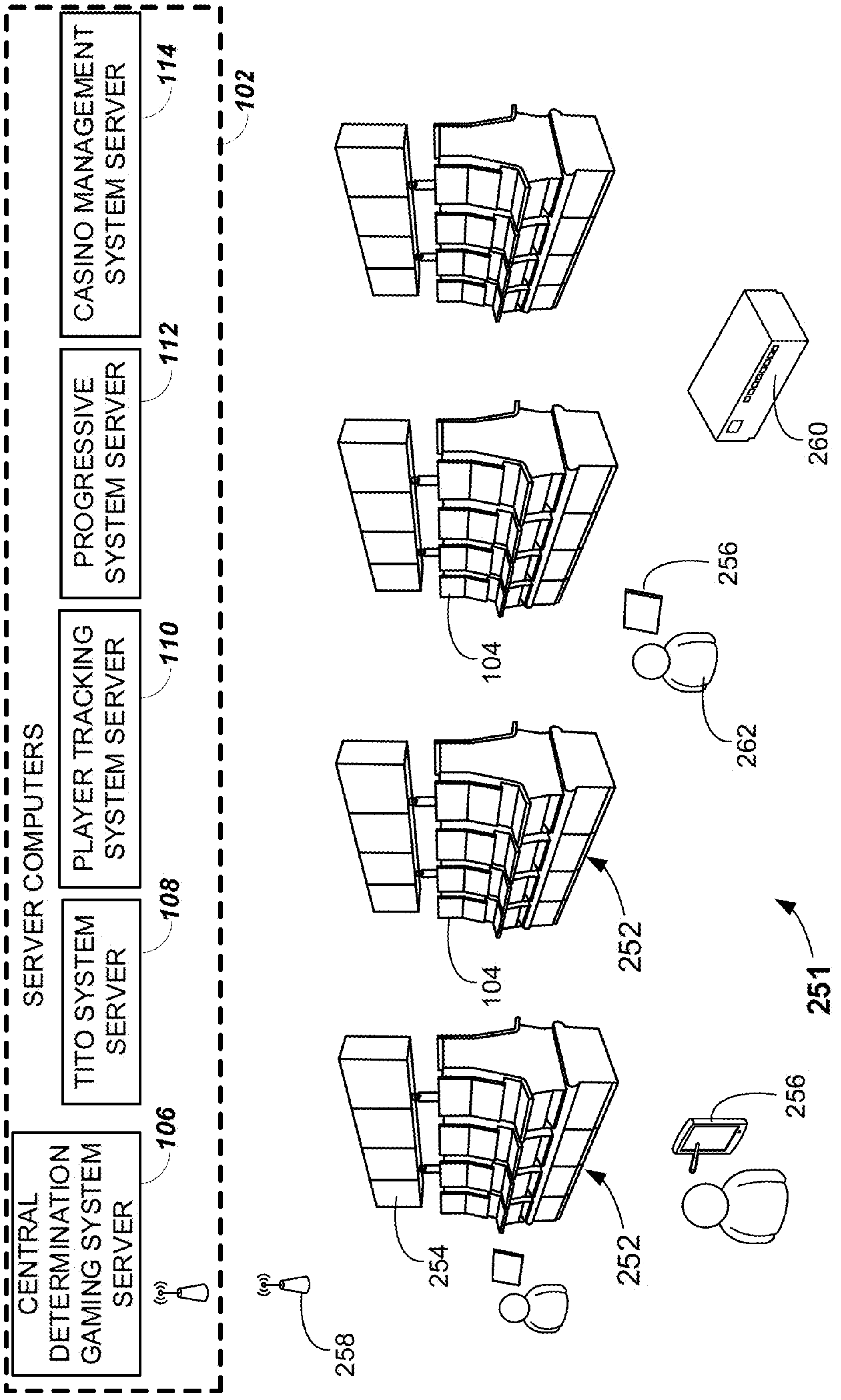
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
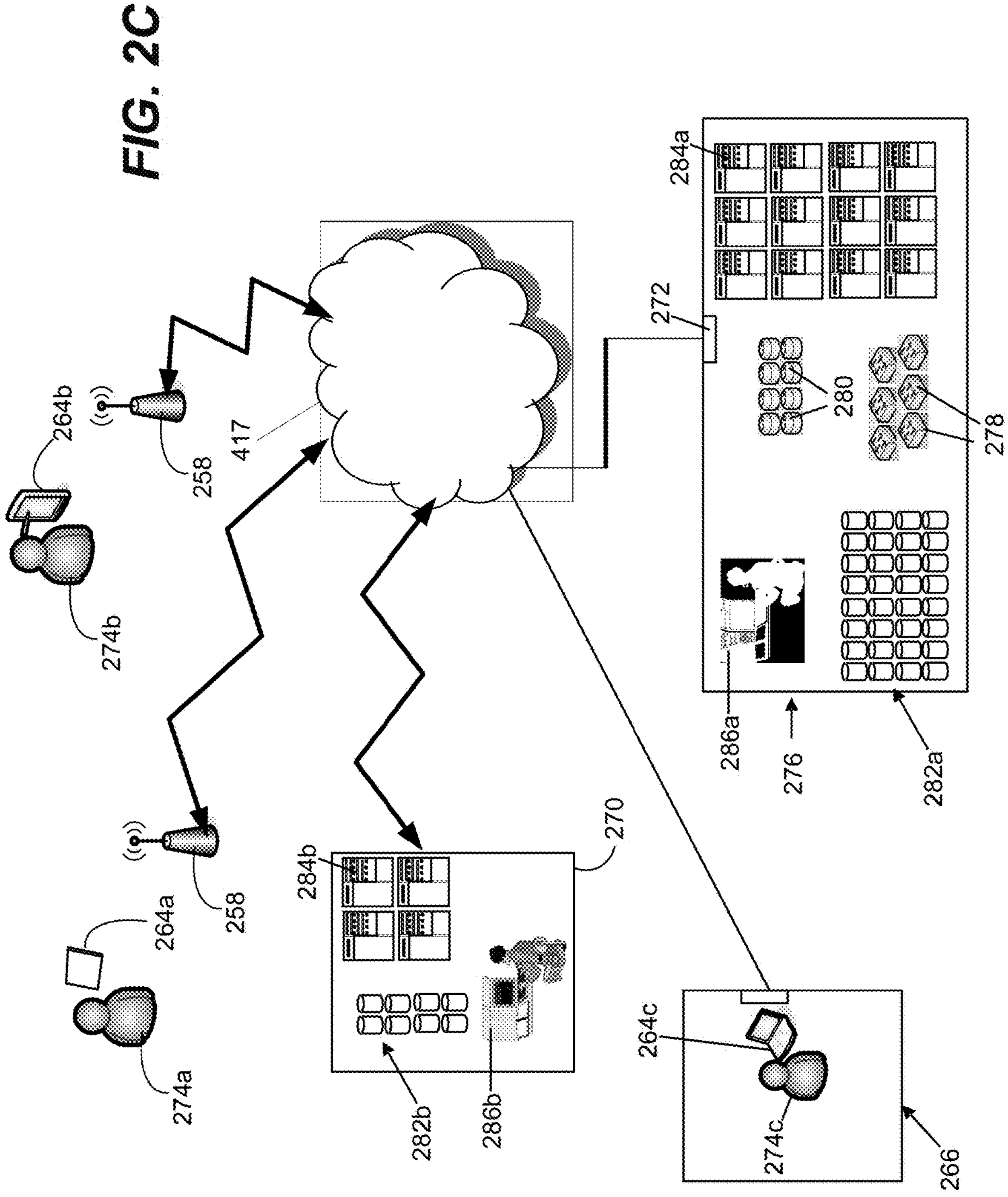
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) **264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2**C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices **282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276**.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
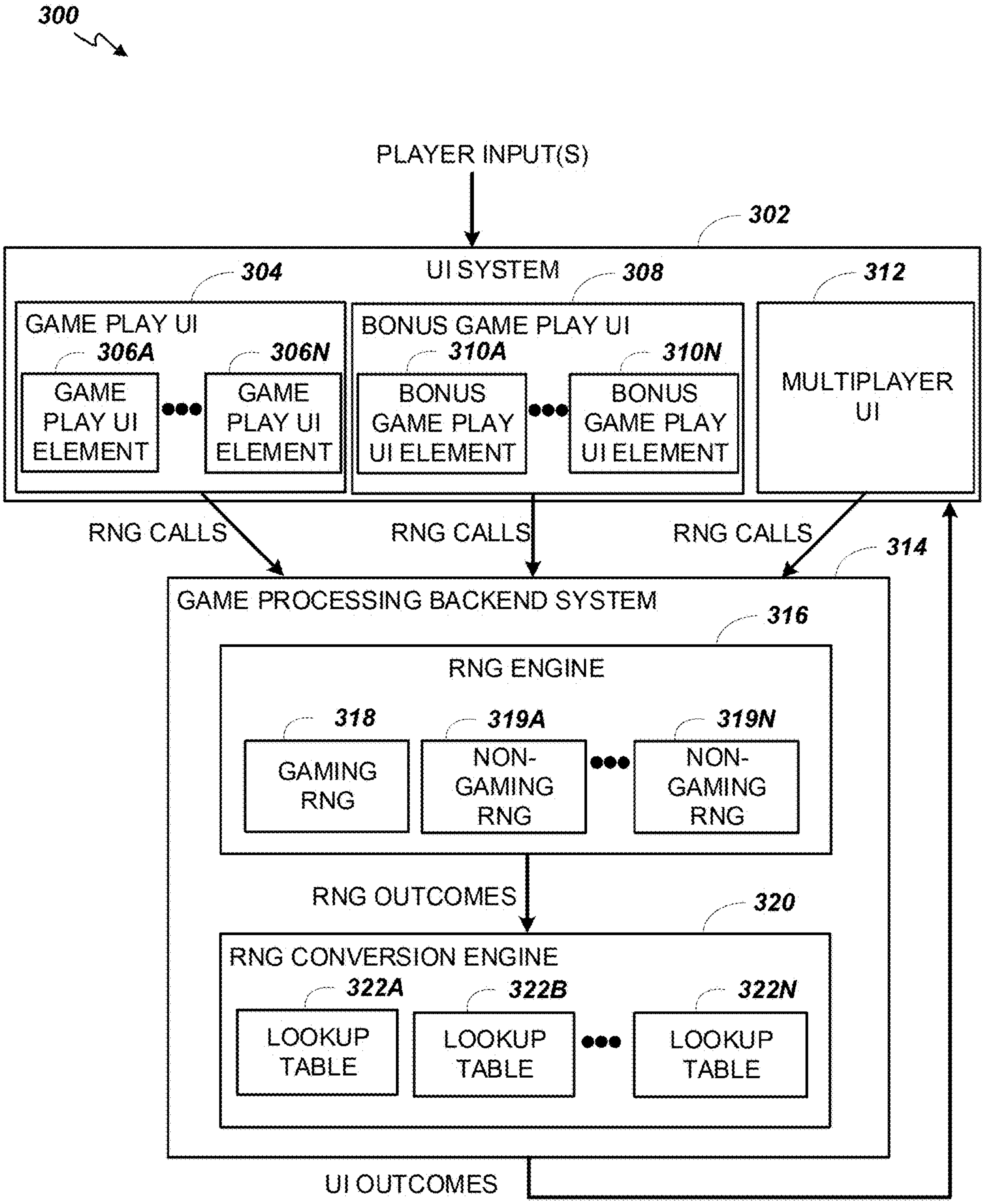
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
FIGS. 4A-4F illustrate an electronic gaming system employing four base games and a randomly activated feature in accordance with various implementations described herein.

Turning to FIGS. 4A through 4F, a gaming machine (e.g., gaming devices 104A to 104X) includes a display 400 with a portion presenting one or more base games. In the example of FIG. 4A, the base game(s) include one or more reel games 402-408, with an added bonus feature(s) and/or symbol(s). In some examples, the bonus feature is an instant win, cash-on symbol feature that can be won on any of the reel games 402-406. The bonus feature may also be available for selection to the player when a trigger for a bonus feature gateway is activated.

As shown, the base game(s) are presented in individual windows 402-408 on a single display 400. In some examples, one or more of the base games or windows may be presented on separate displays, which may be incorporated on the gaming machine (e.g., a secondary display) and/or on a separate device (e.g., another gaming machine, a mobile device, a television screen, etc.).

At the start of each based game, a random call from a weighted table is made, based on a bet amount. Which feature is available as an award is determined by this random selection from the weighted table. For example, if a mega star feature is selected, then the Mega Star feature can be triggered. If a mega train feature is selected, then the Mega Train feature is triggered. A second randomized call can be performed to determine if the feature is to be presented during the reel spin or after reel spin. Although certain awards and/or features are used in some examples (e.g., mega star and mega train features), in other examples other awards and/or features can be randomly selected as disclosed herein.

In the example of FIGS. 4A though 4F, the bonus feature can randomly occur during and/or at completion of the reel spin (e.g., of reel games 402-408). In some examples, activation of the mega feature is made available when one or more minimum thresholds are met (e.g., a minimum bet 422, a minimum number of credits 424, etc.). Award of a bonus may make available one or more progressive payouts/jackpots, and/or additional meters for bonus jackpot values (e.g., mini 420, minor 416, major 418, grand 414). For instance, the game may have a player selectable multi-denomination. The game may support single site progressive (SSP), and stand-alone progressive (SAP) progressive types. In some examples, one or all of the reels may be stopped ahead of standard play time by selection of a button (e.g., a bet button).

Figure 4B:

In some examples, a bonus feature may be awarded for any one or more of the base games 402-408 based on a random assignment, as explained above. As a result, in some examples the bonus feature is presented and progresses through the feature, such as a Cash Express Mega Line feature 426. In some examples, the player is presented with an option to select from one or more available bonus features. As shown in the example of FIG. 4B, icon 403 can be presented with options to select bonus games 405 (e.g., free games, one or more of which offers a payout multiplier), and/or a dynamic feature, such as the Cash Express Mega Line feature.

If the bonus games 405 are selected, the player may be presented with additional options, such as selection of one or more styles of game 411 to be played on the bonus games (e.g., shown in windows for base games 402-408). Additional options may be presented, including the option to increase the wagering amount 422. Based on these selections and/or modifications, gameplay can proceed to the bonus games, with available awards and payouts determined by random assignment, as provided herein. For instance, one or more weighted In some examples, a gateway is triggered from play of the base game(s). If multiple Gateway Picks are triggered on the single spin, the Gateway Picks play out independently but in sequence (e.g., reel game 402 to reel game 408). In some examples, the Gateway Picks play out simultaneously on each available or selected reel game. Upon completion, the value of the credit meter changes (e.g., increases or decreases) by a corresponding amount determined by the outcome of the reel games. Ultimately, gameplay is repeated by the player until the player cashes out or runs out of credits necessary to perform a minimum bet, thereby ending the session.

In some examples, each of the base reel games 402-408 may trigger an award. This can include an increase in credits and/or a bonus game or dynamic feature. The credit increase may be calculated based on the specific base game math of the reel upon which the award is triggered. This may include accessing a weighted table and/or as a result of a triggered RNG call. In other examples, the credit increase can be calculated based on awards earned through one or more of the other base reel games.

A Gateway Pick trigger is dependent on the base game math. Once triggered, the player is offered the choice to play either the Mega Line Cash Express feature or the free games bonus. In some examples, each feature is played on each of the base game reel sets. If the Gateway Pick and the Mega Line Cash Express Feature trigger on the same spin, the Mega Line Cash Express Feature plays first, and then the Gateway Pick is triggered.

Figure 4C:
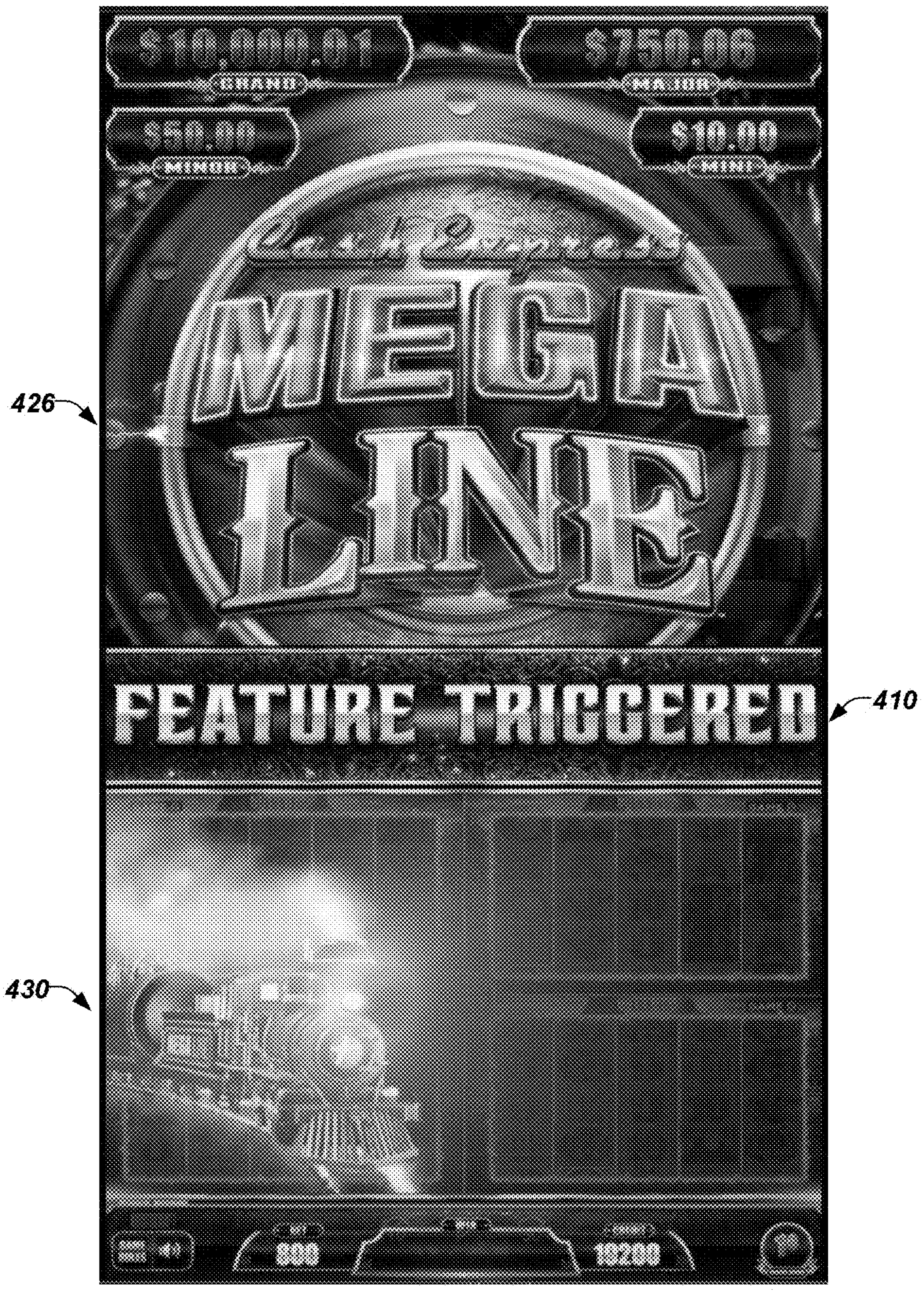
Figure 4D:
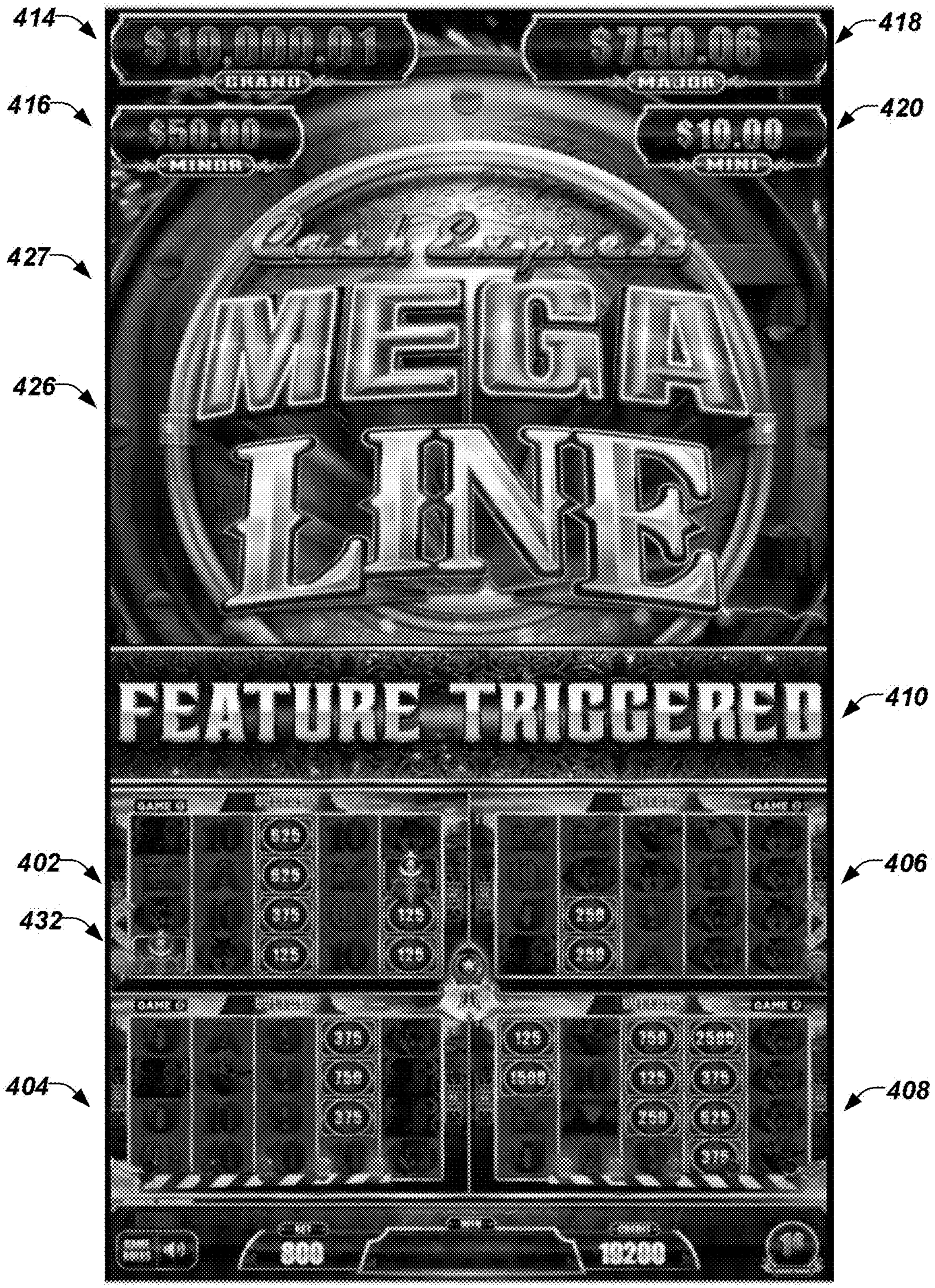

If the Mega Line Cash Express Feature is triggered, as shown in FIG. 4C, and a train symbol 430 is present, as shown in FIG. 4C, then a train feature is awarded. As shown in FIG. 4D, the Mega Line Cash Express indicator 426 is presented in the upper portion of the display. Further, one or more train symbols 432 are presented in the base game(s), indicating a level and/or type of feature to be presented. For example, base game 402 includes a purple train and a blue train, along with several icons showing credit amounts. Base games 404-408 show a variety of credit icons.

Figure 4E:
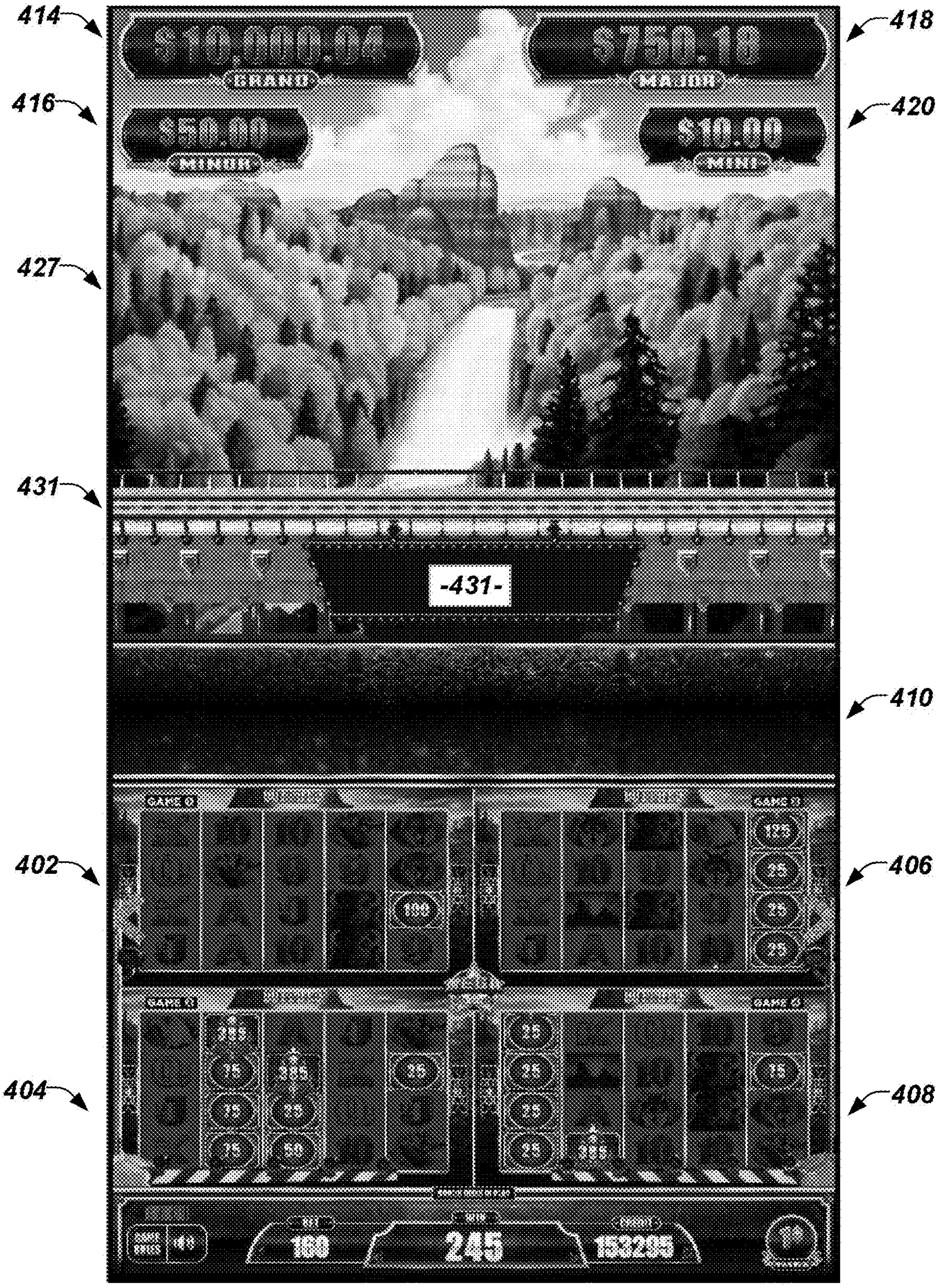

FIG. 4E shows a progression of the Mega Line Cash Express feature. A scene is shown in top portion 427 of the display 400 in preparation for the dynamic feature to be presented. For the example Mega Line Cash Express feature, a set of train tracks 431 is arranged across the screen. A hopper 431 is arranged below the train tracks 431.

Figure 4F:
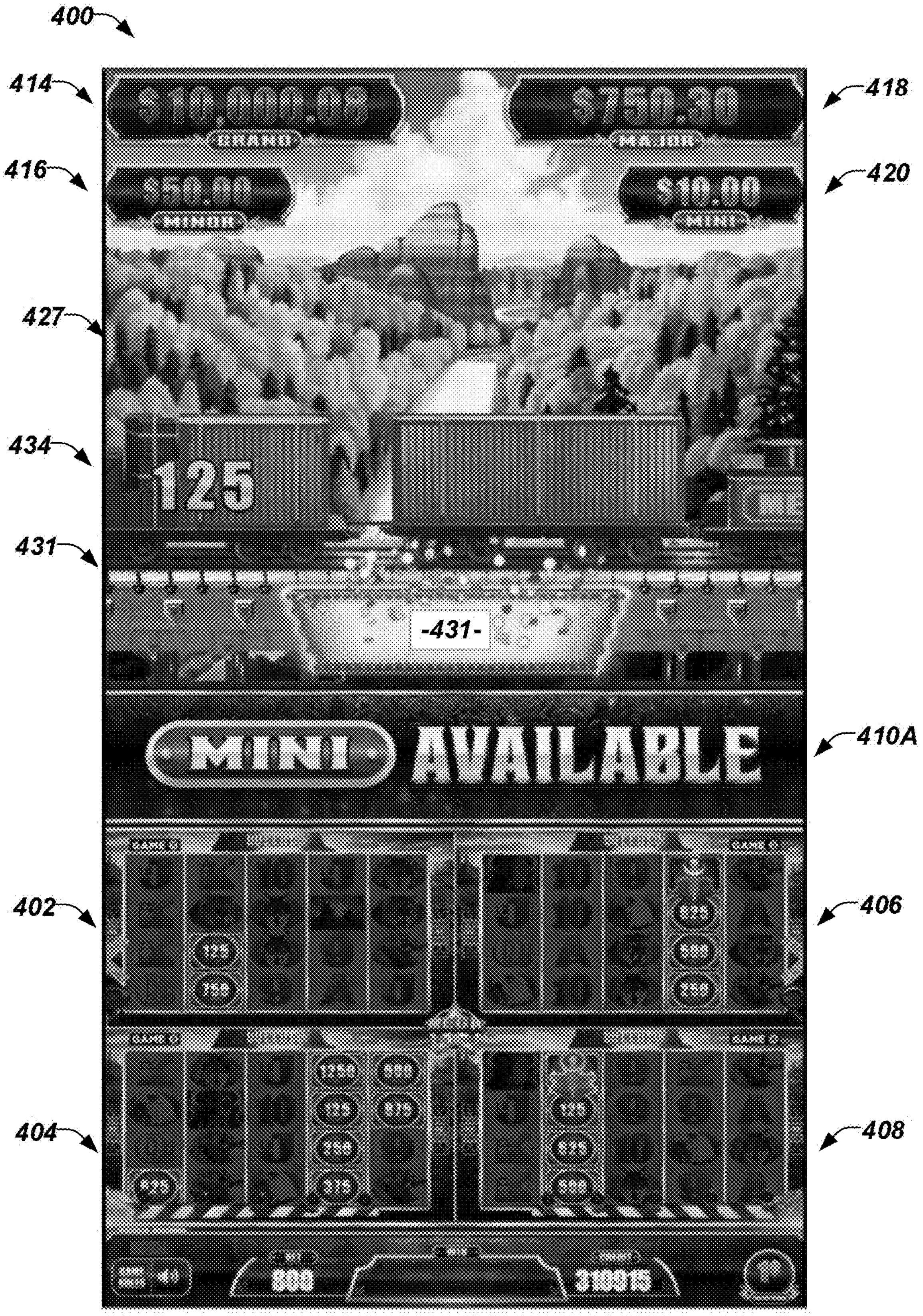

As shown in FIG. 4F, a randomized call is made from a weighted table (e.g., a train carriage weightings table) to determine one or more feature devices, such as a number of train carriages awarded. For example, if the minor train feature 410A is triggered, and a minor train 434 (e.g., purple train) is on the display, a randomized call is made from the corresponding carriage weightings table to determine the number of carriages awarded. For each carriage on the train, a randomized call is made from a carriage values minor table for each carriage to determine the value shown on that carriage. For example, each train carriage may be assigned a payout value (e.g., randomly assigned from a corresponding carriage values table based on a RNG call).

Although FIG. 4F illustrates a mini carriage feature 434, a minor, major or grand feature can be presented in addition or in the alternative. The respective carriage values tables include credit values and/or bonus values. For example, if a mini bonus is chosen instead of a credit value, MINI is shown on the carriage instead of a credit value. Depending on the selected train feature, a Minor train, a Major train, and a Grand train may award a Minor bonus, a Major progressive bonus, or a Grand progressive bonus, respectively.

Which train feature is selected can be carried out via a separate weighted trigger table. As a result, for each spin a specific train is selected (e.g., a trigger selects a minor, a major or a grand train), a randomized call is done from the corresponding trigger table to determine if the corresponding bonus or progressive bonus will be awarded. If no bonus is awarded, the earned credits can be delivered to hopper 431 as the respective carriages travel by. If the bonus is selected, however, the bonus will be presented as the final carriage in the train feature as it traverses the display. This bonus carriage is an additional carriage not included if the credit value carriages are selected.

As shown in FIG. 4F, train feature(s) play out on a top screen 427 of the display. If multiple of the same train land on a triggering spin, the train feature will play out once for that type of train. However, the award value is assigned to all trains of that type appearing on the screen (e.g., where multiple reel sets trigger the train feature). The minor bonus value is included in the train value. By contrast, major and grand progressives may not be included in the train value, as they may be awarded separately. The major and grand progressives are awarded one time in response to a feature reel trigger. Progressives are celebrated and awarded at the time they appear on the carriage.

Figure 5:
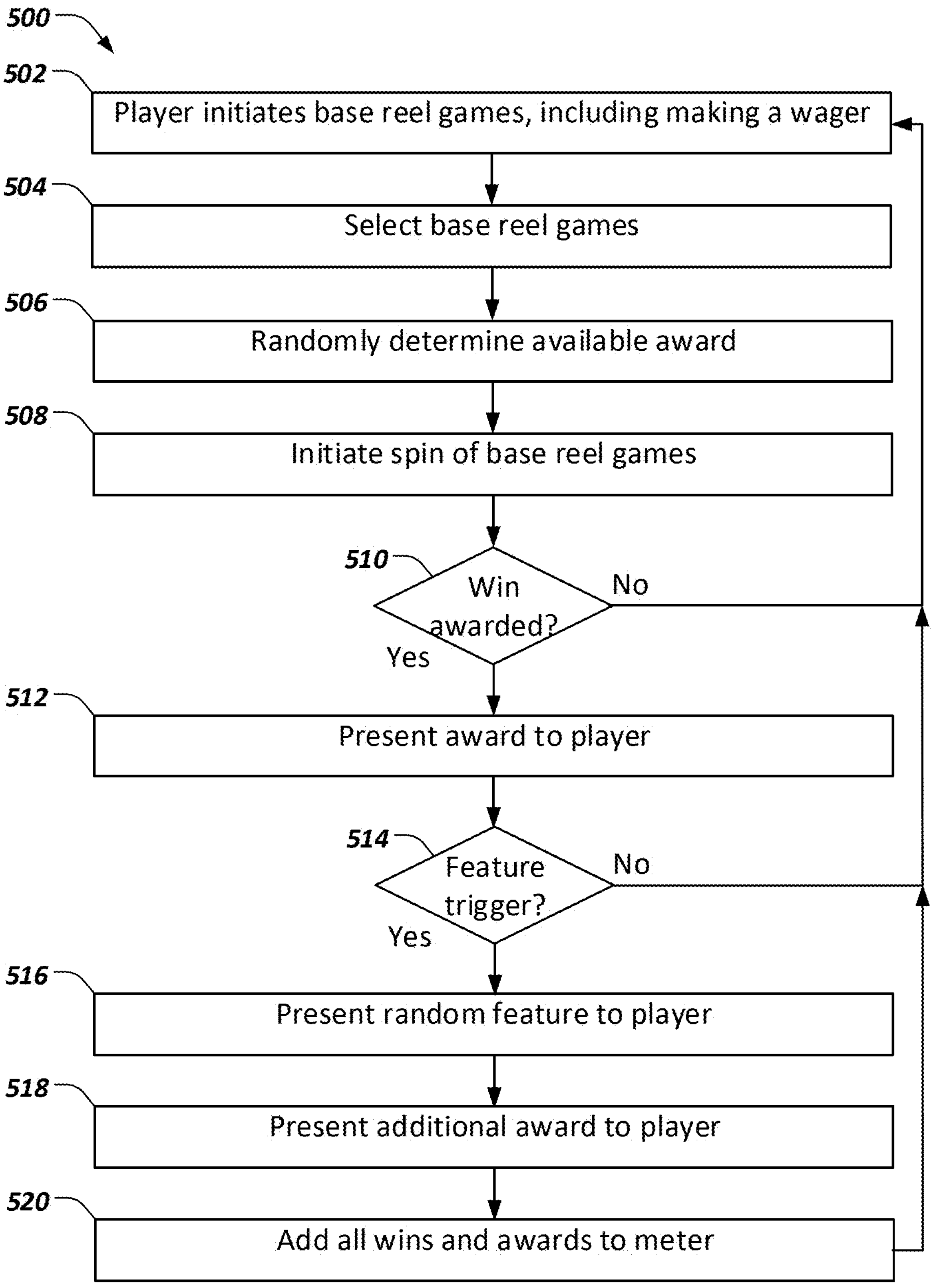
FIG. 5 is an example flowchart of a method of controlling an electronic gaming system employing four base games and a randomly activated feature in accordance with various implementations described herein.

FIG. 5 illustrates a method 500 of controlling an electronic gaming system employing four base games and a randomly activated feature, consistent with one or more examples provided herein. The method 500 can be executed as instructions or algorithms including one or more RNGs (e.g., RNG 212), stored on one or more memory devices (e.g., memory 208), and executed via one or more game controllers and/or central controller (e.g., game controller 202, via one or more processors 204), as provided with respect to FIG. 2.

In block 502, a player initiates a base reel game(s), which may include making a wager. In block 504, the player can select which games they would like to play as each base reel game. For instance, the base games shown in FIG. 4A employ the buffalo game type. However, other games, such as Pompeii, Timberwolf, and 50 Lions, presented at 411 of FIG. 4B, are available for selection (e.g., via the user interface). If no player selection is provided, the game types will be selected at random.

In block 506, a random call (e.g., via a RNG) from a weighted table is made to determine which award is available, such as a bonus game or a dynamic feature. In some examples, a second randomized call can be performed to determine if the award is to be presented during the reel spin or after the reel spin.

The player can initiate spin of the reels in block 508. At the end of the spin, it is determined whether a win, an award, bonus game, and/or dynamic feature has been achieved in block 510. If there are no wins, the game ends and returns to block 502. If one of the reel spins land on a symbol corresponding to a win, an award is presented to the player in block 512. The award can be applied to each of the reel games 402-408, with the amount based on the value of the bet 422 and/or credit 424, in certain examples.

In some examples, a random dynamic feature sequence can be triggered in block 514. If there are no wins, the game ends and returns to block 502. If the previously determined random call determines which dynamic feature to present, and when the dynamic feature is to be presented (e.g., during and/or after completion of the base game), the random dynamic feature sequence is presented to the player in block 516.

Based on the determined random dynamic feature, an additional award or bonus can be presented to the player in block 518. For example, if a Mega Train dynamic feature randomly appears, the sum of all wins (e.g., Cash Express Wins) is awarded and increased by a multiplier (e.g., up to 10 times the win amount). If the Mega Star dynamic feature randomly appears, the sum of all wins (e.g., Cash Express Wins) is awarded. After all features and any bonus rounds are completed, all wins from the initial spin and the bonus rounds are added together and shown in the win meter, as shown in block 520. If there are one or more ways wins or line wins, the total of the ways wins or line wins will show in the win meter and the credit amount will increase by the amount shown in the win meter. Following presentment of the random dynamic feature and addition of all awards and bonuses, the method returns to block 502.

Figure 6A:
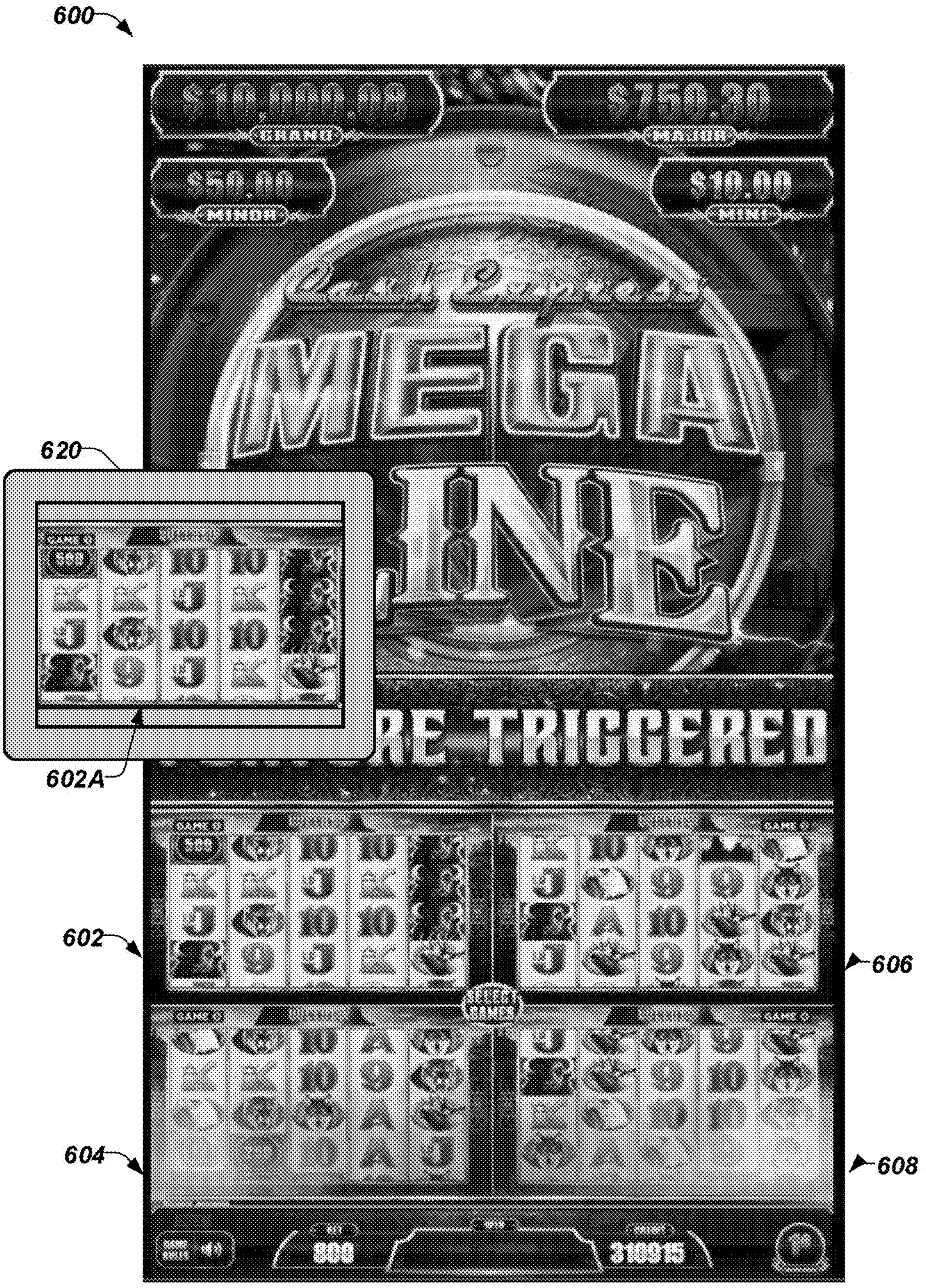
FIG. 6A illustrates an electronic gaming system and remote device employing four base games and a randomly activated feature in accordance with various implementations described herein.

In some disclosed examples, separate and/or remote devices can be linked to gameplay in some examples. As shown in FIG. 6A, a remote or mobile device 640 (e.g., a smartphone, a tablet computer, a remote display screen, a laptop, etc.) is synced with gameplay of base games 602-606 within display 600 of a gaming machine. The remote device 440 can be operated as a display (e.g., to view progression of the game(s)) and/or to provide user commands to control the game(s) (e.g., via a user interface). In the example of FIG. 6A, the remote device 640 displays a representation 602A of the base game operating in window 602. The remote device 640 may display representations of each base game in a sequence, in response to a trigger in a particular base game (e.g., receipt of an award), and/or present a representation of a particular base game according to a player selection.

If awarded a free game and/or dynamic feature, those options are presented to the user on the remote device 640, similar to the presentation shown in FIG. 4B. Selection of an option may be effected by a number of input devices, including a touchscreen, a physical button, and/or spoken command. Once a selection is made, the bonus game or dynamic feature may proceed on the remote device 640, on the display 600, or some combination of both. For instance, the selection may proceed on both simultaneously with similar or identical content, the remote device 640 may display a portion of what is shown on display 600, and/or the remote device 640 may provide other complementary content, such as information, instructions, and/or controls for interacting with the items on display 600.

Figure 6B:
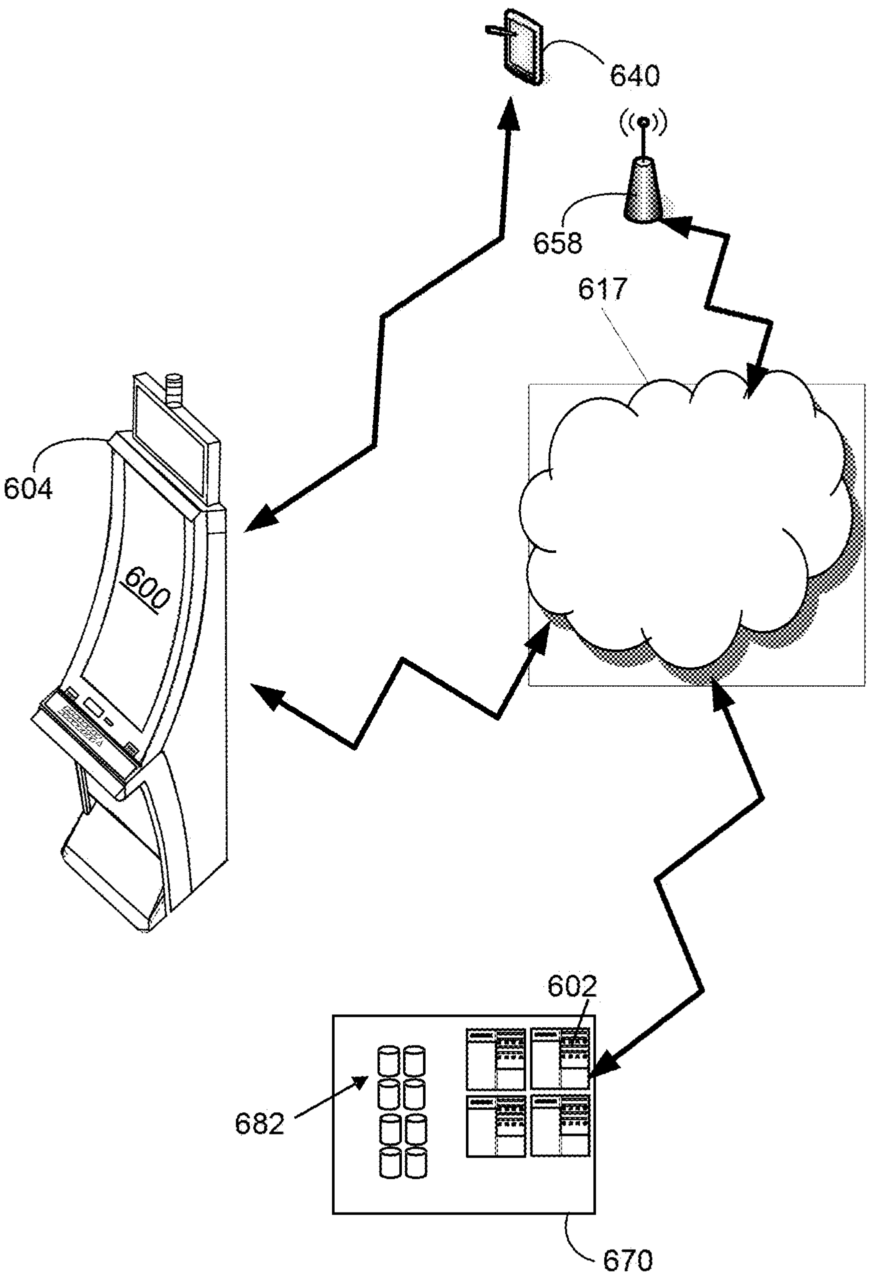
FIG. 6B illustrates a network including an electronic gaming system and remote device in accordance with various implementations described herein.

There are a number of network scenarios by which the gameplay described herein may proceed on a remote or mobile device. In the example of FIG. 6B, a data center 670 is configured for communication with a gaming machine 604 (similar to gaming machines 104A-104X of FIG. 1) and/or a remote device 640 via a network 617 (similar to network 217 of FIG. 2). Here, the data center 670 includes a remote game server (RGS) 602 and storage devices 682 house processors, gaming systems, and/or instructions for operating gaming machines and implementing and coordinating gameplay between devices. For example, the network 617 is configured to communicate via one or more protocols (wired and/or wireless), such as via router 658. In some examples, the data center 670 communicates with one of the gaming machine 604 or the remote device 640, which communicates instructions and/or receives commands from the other, non-connected device.

In an example, the RGS 602 (e.g., similar to server computers 102) may be connected to gaming machine 604 (e.g., similar to gaming devices 104A to 104X) and the remote device 640, such that available payouts/awards are accessed and stored on the RGS 602.

In another example, the gaming machine may connect directly to the remote device 440, with the gaming machine operable to control and/or coordinate display and/or gameplay with the remote device 640. For instance, the gaming machine 604 may connect to the RGS 602 for instructions, receipt of outputs from RNG calls, selection of payouts, etc., and convey that information to the remote device 640. The gaming machine 604 may also present information on the remote device 640 and receive commands therefrom.

The remote device 640 may also be equipped with an application for gameplay independent of any gaming machine. Remote gaming can be controlled by connection to the RGS 602, allowing the player to access the game from any connected environment. For example, a betting authorized location, such as the gaming floor, may allow the player to use such a device for betting with cash assets or equivalent. To enable such play, the remote device 640 may require access codes or similar keys to communicate with the RGS 602, thereby ensuring compliance with regulatory requirements.

In some examples, gameplay is also enabled in unauthorized betting locations. The remote device 640 can operate in a non-wagering mode, which allows the player to earn non-monetary rewards and/or virtual credits. Earned rewards and credits may be redeemed at designated areas, such as a casino located in a betting authorized location. For instance, the rewards and credits may be converted into cash assets or equivalent, and may be applied to a game, such as the base games 602-608, once the remote device 640 has reached the betting authorized location and successfully paired with a gaming machine.

In some examples, there could a meta-verse game window environment. A virtual reality (VR) or augmented reality (AR) environment may be implemented to engage the player. For instance, a camera can image the player and present a display showing the player within the gaming environment. In this example, the player may be imaged in a virtual gaming environment as features of gameplay surround and/or interact with the player. In an example game with an active Mega Train feature, the player may be riding the train and/or watching it pass.

In some examples, the player may be able to view the gaming environment from their perspective, such as through VR/AR glasses and/or through the view screen of a remote device (e.g., remote device 640). This capability would provide an engrossing experience for the player.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

a display configured to present a user interface (UI); and a game controller including one or more processors and one or more memories storing program code including instructions executable by the one or more processors to cause the game controller to at least:

display a plurality of reel games as base games on the display screen;

receive a first input from the user interface corresponding to gameplay;

configure, during gameplay, a transition of one or more of the reel games to a bonus game or dynamic feature based on a corresponding weighted probability of activating one or more bonus game or dynamic feature types from a random number generator (RNG), the configuring of the transition including controlling one or more of a speed or a progression at which the one or more reel games transitions to the bonus game or dynamic feature while satisfying a designated return to player (RTP);

spin reels of at least the one or more reel games in response to the first input; and perform the configured transition to present the bonus game or dynamic feature on the display.

2. The electronic gaming system as claimed in claim 1, wherein the instructions are executable by the one or more processors to cause the game controller to:

determine an award has been achieved; and apply the award to each of the reel games.

3. The electronic gaming system as claimed in claim 1, wherein the instructions are executable by the one or more processors to cause the game controller to:

determine a type of bonus game or dynamic feature from the one or more bonus game or dynamic feature types from a second RNG;

determine a multiplier has been achieved based on the determined type of bonus game or dynamic feature; and apply the multiplier to a value associated with an award.

4. The electronic gaming system as claimed in claim 1, wherein the first input from the user interface corresponds to selection of a first game type for a first reel game of the reel games.

5. The electronic gaming system as claimed in claim 4, wherein the instructions are executable by the one or more processors to cause the game controller to receive a second input from a user interface corresponding to selection of a second game type for a second of the reel games, wherein the first and second game types are different.

6. The electronic gaming system as claimed in claim 1, wherein the instructions are executable by the one or more processors to cause the game controller to:

present an icon representing an option to select a bonus game or a dynamic feature on the display;

receive a third input corresponding to selection of the bonus game or the dynamic feature; and activate the selected bonus game or dynamic feature and present the bonus game or the dynamic feature on the display.

7. The electronic gaming system as claimed in claim 6, wherein the instructions are executable by the one or more processors to cause the game controller to:

access a weighted table corresponding to a feature award in response to selection of the dynamic feature;

determine a specific award type from the weighted table; and present the award type on the display.

8. The electronic gaming system as claimed in claim 1, wherein the dynamic feature is an animated train with multiple carriages, each carriage containing unique credit values.

9. A non-transitory computer readable medium storing a plurality of instructions, the instructions configured to be executed by a processor to cause the processor to perform operations comprising:

displaying a plurality of reel games as multiple base games on a display;

receiving a first input corresponding to gameplay;

configuring, during gameplay, a transition of one or more of the reel games to a bonus game or dynamic feature based on a corresponding weighted probability of activating one or more bonus game or dynamic feature types from a random number generator (RNG), the configuring of the transition including controlling one or more of a speed or a progression at which the one or more reel games transitions to the bonus game or dynamic feature while satisfying a designated return to player (RTP);

spinning one or more reels of at least the one or more reel games in response to the first input; and performing the configured transition to present the bonus game or dynamic feature on the display.

10. The non-transitory computer readable medium as claimed claim 9, wherein the instructions are configured to be executed by the processor to cause the processor to perform further operations comprising:

generating a second probability of presenting a bonus feature during gameplay based on a probability of activating one or more bonus feature types from the RNG; and presenting the bonus feature in on the display when the second probability exceeds a threshold bonus feature value.

11. The non-transitory computer readable medium as claimed in claim 10, wherein the bonus feature is a number of free games.

12. The non-transitory computer readable medium as claimed in claim 9, wherein the first input corresponds to selection of one or more game types.

13. A remote device comprising:

a user interface (UI) including one or more inputs;

a display;

a network interface to communicate with an electronic gaming machine or a remote game server; and a game controller including one or more processors and one or more memories storing program code including instructions executable by the one or more processors to cause the game controller to at least:

receive instructions from the electronic gaming machine or remote game server to display a plurality of reel games as base games on the display;

receive a first input from the user interface corresponding to gameplay;

receive instructions from the electronic gaming machine or remote game server to spin reels of at least one of the reel games in response to the first input;

receive instructions from the electronic gaming machine or remote game server indicating a configuring, during gameplay, of a transition of one or more of the reel games to a bonus game or dynamic feature based on a corresponding weighted probability of activating one or more bonus game or dynamic feature types from a random number generator (RNG) call, the configuring of the transition including controlling one or more of a speed or a progression at which the one or more reel games transitions to the bonus game or dynamic feature while satisfying a designated return to player (RTP); and receive instructions from the electronic gaming machine or remote game server to perform the configured transition to present the bonus game or dynamic feature in on the display.

14. The remote device as claimed in claim 13, wherein the instructions are executable by the one or more processors to cause the game controller to:

receive a determination from the electronic gaming machine or remote game server that an award has been achieved; and apply the award to each of the reel games.

15. The remote device as claimed in claim 13, wherein the instructions are executable by the one or more processors to cause the game controller to:

receive a determination from the electronic gaming machine or remote game server that a type of bonus game or dynamic feature from the one or more bonus game or dynamic feature types were selected via a second RNG call;

receive a determination from the electronic gaming machine or remote game server that a multiplier has been achieved based on the determined type of bonus game or dynamic feature; and apply the multiplier to a value associated with an award.

16. The remote device as claimed in claim 13, wherein the first input from the user interface corresponds to selection of a first game type for a first reel game of the reel games.

17. The remote device as claimed in claim 16, wherein the instructions are executable by the one or more processors to cause the game controller to receive a second input from a user interface corresponding to selection of a second game type for a second of the four reel games, wherein the first and second game types are different.

18. The remote device as claimed in claim 13, wherein the instructions are executable by the one or more processors to cause the game controller to:

receive instructions from the electronic gaming machine or remote game server to present an icon representing an option to select a bonus game or a dynamic feature on the display;

receive a third input corresponding to selection of the bonus game or the dynamic feature; and activate the selected bonus game or dynamic feature and present the bonus game or the dynamic feature on the display.

19. The remote device as claimed in claim 18, wherein the instructions are executable by the one or more processors to cause the game controller to:

transmit information corresponding to a selection of a feature award to the electronic gaming machine or remote game server;

receive instructions from the electronic gaming machine or remote game server corresponding to a determination of the selection of a specific award type from a weighted table corresponding to a feature award in response to selection of the dynamic feature; and present the award type on the display.

20. The remote device as claimed in claim 18, wherein the dynamic feature is an animated train with multiple carriages, each carriage containing unique credit values.

* * * * *